US011935483B2

(12) United States Patent
Yuan et al.

(10) Patent No.: US 11,935,483 B2
(45) Date of Patent: Mar. 19, 2024

(54) PIXEL CIRCUIT AND DRIVING METHOD THEREOF, AND DISPLAY PANEL

(71) Applicants: HEFEI BOE JOINT TECHNOLOGY CO., LTD., Anhui (CN); BOE TECHNOLOGY GROUP CO., LTD., Beijing (CN)

(72) Inventors: Zhidong Yuan, Beijing (CN); Yongqian Li, Beijing (CN); Can Yuan, Beijing (CN)

(73) Assignees: HEFEI BOE JOINT TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 166 days.

(21) Appl. No.: 17/310,353

(22) PCT Filed: Dec. 29, 2020

(86) PCT No.: PCT/CN2020/140707
§ 371 (c)(1),
(2) Date: Jul. 28, 2021

(87) PCT Pub. No.: WO2021/169570
PCT Pub. Date: Sep. 2, 2021

(65) Prior Publication Data

US 2022/0319433 A1 Oct. 6, 2022

(30) Foreign Application Priority Data

Feb. 28, 2020 (CN) ......................... 202010126907.8

(51) Int. Cl.
*G09G 3/3266* (2016.01)
*G09G 3/3233* (2016.01)
*G09G 3/3291* (2016.01)

(52) U.S. Cl.
CPC ......... *G09G 3/3266* (2013.01); *G09G 3/3233* (2013.01); *G09G 3/3291* (2013.01); *G09G 2310/0286* (2013.01)

(58) Field of Classification Search
CPC .. G09G 3/3266; G09G 3/3233; G09G 3/3291; G09G 2310/0286
See application file for complete search history.

(56) References Cited

U.S. PATENT DOCUMENTS

2016/0042690 A1* 2/2016 Chang .................. G09G 3/3258 345/212
2020/0020268 A1 1/2020 Kim et al.
2020/0213536 A1* 7/2020 Wang ..................... H04N 25/77

FOREIGN PATENT DOCUMENTS

CN 103165078 A 6/2013
CN 106991964 A 7/2017
(Continued)

OTHER PUBLICATIONS

First Office Action dated Oct. 29, 2020 for application No. CN202010126907.8 with English translation attached.
(Continued)

*Primary Examiner* — Kenneth B Lee, Jr.
(74) *Attorney, Agent, or Firm* — Nath, Goldberg & Meyer; Joshua B. Goldberg

(57) ABSTRACT

Provided are a pixel circuit, a driving method thereof and a display panel. The pixel circuit includes: multiple sub-pixel circuits in an array; each sub-pixel circuit includes a first node control sub-circuit, a second node control sub-circuit, a driving sub-circuit, a storage sub-circuit, a reading sub-circuit and a light emitting device; at least reading sub-circuits of the sub-pixel circuits of some rows are controlled by a same sensing control line; the first node control sub-circuit charges the storage sub-circuit in response to a first scan signal; the second node control sub-circuit writes
(Continued)

a reference voltage signal into a second node in response to a second scan signal; the reading sub-circuit reads a potential of the second node in response to a sensing control signal written by a sensing control line; the driving sub-circuit drives the light emitting device to emit light.

19 Claims, 6 Drawing Sheets

(56) References Cited

FOREIGN PATENT DOCUMENTS

| | | | |
|---|---|---|---|
| CN | 108877611 | A | 11/2018 |
| CN | 109166527 | A | 1/2019 |
| CN | 109166529 | A | 1/2019 |
| CN | 109742134 | A | 5/2019 |
| CN | 109935212 | A | 6/2019 |
| CN | 110235193 | A | 9/2019 |
| CN | 110288949 | A | 9/2019 |
| CN | 110415644 | A | 11/2019 |
| CN | 110428779 | A | 11/2019 |
| CN | 110444168 | A | 11/2019 |
| CN | 110491337 | A | 11/2019 |
| CN | 110570816 | A | 12/2019 |
| CN | 110718193 | A | 1/2020 |
| CN | 111261101 | A | 6/2020 |
| KR | 20200016663 | A | 2/2020 |

OTHER PUBLICATIONS

Second Office Action dated Jun. 29, 2021 for application No. CN202010126907.8 with English translation attached.
Decision of Rejection dated Sep. 3, 2021 for application No. CN202010126907.8 with English translation attached.
Office Action dated Mar. 17, 2022 issued in corresponding Chinese Application No. 202010126907.8.

* cited by examiner

PIXEL CIRCUIT AND DRIVING METHOD THEREOF, AND DISPLAY PANEL

This is a National Phase Application filed under 35 U.S.C. 371 as a national stage of PCT/CN2020/140707, filed Dec. 29, 2020, an application claiming the benefit of Chinese Application No. 202010126907.8, filed Feb. 28, 2020, the content of each of which is hereby incorporated by reference in its entirety.

TECHNICAL FIELD

The present disclosure relates to the field of display technology, and particularly relates to a pixel circuit, a driving method of the pixel circuit and a display panel.

BACKGROUND

In the related art, a Thin Film Transistor (TFT) is integrated on an array substrate by using a Gate Driver on Array (GOA) technology to scan and drive gate lines in a display panel, so that a Gate Driver IC can be omitted, and facilitating implementation of a narrow bezel.

For a display panel with an external compensation function, each gate driving unit in a gate driving circuit (composed of a plurality of gate driving units coupled in cascade) is required to not only output a driving signal for controlling a display switch transistor to be turned on in a display driving stage, but also output a driving signal for controlling a sensing switch transistor to be turned on in a sensing stage, that is, the gate driving unit is required to have a function of outputting a double pulse signal. However, since a shift register in related art can output only a single pulse signal, a case where one gate driving unit includes only one shift register cannot satisfy such driving requirement.

SUMMARY

The present disclosure is directed to solve at least one of problems of the related art, and provides a pixel circuit, a driving method of the pixel circuit, and a display panel.

In a first aspect, an embodiment of the present disclosure provides a pixel circuit, which includes: a plurality of sub-pixel circuits arranged in an array; each of the plurality of sub-pixel circuits includes a first node control sub-circuit, a second node control sub-circuit, a driving sub-circuit, a storage sub-circuit, a reading sub-circuit and a light emitting device; where at least reading sub-circuits of the sub-pixel circuits in a portion of different rows are controlled by a same sensing control line;

the first node control sub-circuit is configured to charge the storage sub-circuit in response to a first scan signal;

the second node control sub-circuit is configured to write a reference voltage signal into a second node in response to a second scan signal;

the reading sub-circuit is configured to read a potential of the second node in response to a sensing control signal written by the sensing control line; and the driving sub-circuit is configured to drive the light emitting device to emit light in response to voltage signals of a first node and the second node.

In some implementation, the first scan signal to which the first node control sub-circuit of the sub-pixel circuit in an $(N+1)^{th}$ row responses is configured as the second scan signal to which the second node control sub-circuit of the sub-pixel circuit in an $N^{th}$ row responses.

In some implementation, the first node control sub-circuit is coupled to the first node, a data line, and a first scan line; the second node control sub-circuit is coupled to a reading line, the second node and a second scan line; where, the first scan line to which the first node control sub-circuit of the sub-pixel circuit of the $(N+1)^{th}$ row is coupled is common to the second scan line to which the second node control sub-circuit of the sub-pixel circuit of the $N^{th}$ row is coupled; N is a natural number.

In some implementation, rows of sub-pixel circuits controlled by the same sensing control line are adjacent to each other.

In some implementation, every two or four adjacent rows of sub-pixel circuits are controlled by the same sensing control line.

In some implementation, the first node control sub-circuit includes a first transistor;

a first electrode of the first transistor is coupled with the data line, a second electrode of the first transistor is coupled with the first node, and a control electrode of the first transistor is coupled with the first scan line.

In some implementation, the second node control sub-circuit includes a second transistor;

a first electrode of the second transistor is coupled with a reading line, a second electrode of the second transistor is coupled with the second node, and a control electrode of the second transistor is coupled with the second scan line.

In some implementation, the driving sub-circuit includes a third transistor;

a first electrode of the third transistor is coupled to a first power voltage terminal, a second electrode of the third transistor is coupled to the second node, and a control electrode of the third transistor is coupled to the first node.

In some implementation, the reading sub-circuit includes a fourth transistor;

a first electrode of the fourth transistor is coupled to a reading line, a second electrode of the fourth transistor is coupled to the second node, and a control electrode of the fourth transistor is coupled to the sensing control line.

In some implementation, the storage sub-circuit includes a storage capacitor;

a first terminal of the storage capacitor is coupled with the first node, and a second terminal of the storage capacitor is coupled with the second node.

In some implementation, the light emitting device includes an organic light emitting diode;

a first electrode of the organic light emitting diode is coupled with the second node, and a second electrode of the organic light emitting diode is coupled with a second power voltage terminal.

In some implementation, the first node control sub-circuit includes a first transistor; the second node control sub-circuit includes a second transistor; the driving sub-circuit includes a third transistor; the reading sub-circuit includes a fourth transistor; the storage sub-circuit includes a storage capacitor; the light emitting device includes an organic light emitting diode;

a first electrode of the first transistor is coupled with a data line, a second electrode of the first transistor is coupled with the first node, and a control electrode of the first transistor is coupled with a first scan line;

a first electrode of the second transistor is coupled with a reading line, a second electrode of the second transistor is coupled with the second node, and a control electrode of the second transistor is coupled with a second scan line;

a first electrode of the third transistor is coupled with a first power voltage terminal, a second electrode of the third transistor is coupled with the second node, and a control electrode of the third transistor is coupled with the first node;

a first electrode of the fourth transistor is coupled with the reading line, a second electrode of the fourth transistor is coupled with the second node, and a control electrode of the fourth transistor is coupled with the sensing control line;

a first terminal of the storage capacitor is coupled with the first node, and the second terminal of the storage capacitor is coupled with the second node;

a first electrode of the organic light emitting diode is coupled with the second node, and the second electrode of the organic light emitting diode is coupled with a second power voltage terminal.

In a second aspect, an embodiment of the present disclosure provides a driving method of the pixel circuit described above, which includes a display stage and a sensing stage; where, at the display stage, under a control of the first scan signal, the first node control sub-circuit writes a data voltage signal into the first node, under a control of the second scan signal, the second node control sub-circuit writes a reference voltage signal into the second node, and the driving sub-circuit is controlled, by potentials of the first node and the second node, to drive the light emitting device to emit light;

at the sensing stage, under the control of the first scan signal, the first node control sub-circuit writes a sensing signal into the first node, and under the control of a sensing control signal input by the sensing control line, the reading sub-circuit reads the potential of the second node to output it through a reading line.

In a third aspect, an embodiment of the present disclosure provides a display panel, which includes the pixel circuit described above.

In some implementations, the display panel further includes a gate driving circuit; the gate driving circuit includes P stages of shift registers; where, the first scan line of an $i^{th}$ row is coupled with a scan signal output terminal of the shift register of an $i^{th}$ stage, i is greater than or equal to 1 and is less than or equal to P, and i and P are both natural numbers; and the shift register coupled to one row of sub-pixel circuits coupled to the same sensing control line has a sensing signal output terminal and is coupled to the sensing control line.

DRAWINGS

DETAILED DESCRIPTION

Figure 1:
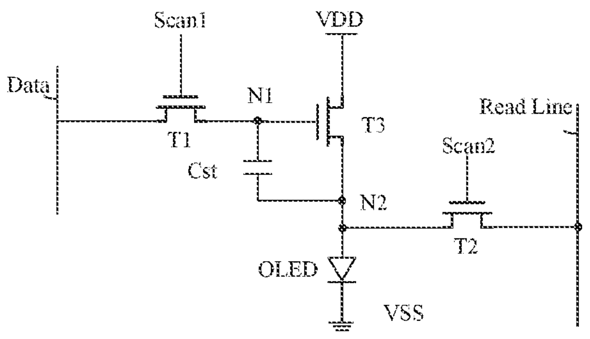
FIG. 1 is a circuit diagram of a sub-pixel circuit in related art.

In order to make technical solutions of the present disclosure better understood, the present disclosure is further described in detail with reference to the accompanying drawings and the detailed description below.

Unless defined otherwise, technical or scientific terms used herein shall have the ordinary meaning as understood by one of ordinary skill in the art to which the present disclosure belongs. The use of “first”, “second”, and the like in the present disclosure is not intended to indicate any order, quantity, or importance, but rather is used to distinguish one element from another. Also, the use of the terms “a”, “an” or “the” and similar referents do not denote a limitation of quantity, but rather denote the presence of at least one. The word “include”, “comprise”, or the like, means that the element or item preceding the word includes the element or item listed after the word and its equivalent, but does not exclude other elements or items. The terms “coupled” or “connected” and the like are not restricted to physical or mechanical connections, but may include electrical connections, whether direct or indirect. The word “upper”, “lower”, “left”, “right”, and the like are used only to indicate relative positional relationships, and when the absolute position of the object being described is changed, the relative positional relationships may also be changed accordingly.

It should be noted that the transistors used in the embodiments of the present disclosure may be thin film transistors or field effect transistors or other devices with the same characteristics, and since the source and the drain of the transistor used are symmetrical, the source and the drain are not different. In the embodiments of the present disclosure, to distinguish the source and the drain of the transistor, one of them is referred to as a first electrode, the other is referred to as a second electrode, and the gate of the transistor is referred to as a control electrode. In addition, the transistors can be divided into N-type transistors and P-type transistors according to the characteristics of the transistors, and in the following embodiments, the N-type transistors are used for explanation, when the N-type transistors are used, the first electrode is the source of the N-type transistor, the second electrode is the drain of the N-type transistor, and when a high level is input to the gate, a current is allowed between the source and the drain, and for the P-type transistors, the opposite is true. It is contemplated that an implementation with the P-type transistors will be readily contemplated by those skilled in the art without creative effort, and thus, are within the scope of the present disclosure.

In the embodiments of the present disclosure, since the transistors used are N-type transistors, an operation level signal in the embodiment of the present disclosure refers to a high level signal, and a non-operation level signal refers to a low level signal; correspondingly, an operation level terminal is a high level signal terminal, and a non-operation level terminal is a low level signal terminal. A first power voltage written into a first power voltage terminal is greater than a second power voltage written into a second power voltage terminal, in the embodiment of the present disclosure, the first power voltage is a high power voltage, and the second power voltage is a low power voltage.

For an organic light emitting diode display panel with an external compensation function, a frame of picture can be divided into two stages: a display driving stage and a sensing stage; in the display driving stage, display driving of pixel units in each row in the display panel are completed; in the sensing stage, current extracting (i.e., sensing) of some rows of pixel units in the display panel are completed.

Figure 2:
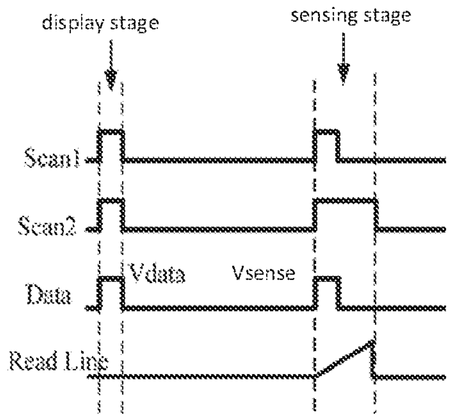
FIG. 2 is a driving timing diagram of the sub-pixel circuit shown in FIG. 1.

In an example, FIG. 1 is a schematic structural diagram of a sub-pixel circuit in a pixel circuit in an organic light emitting diode display panel, and FIG. 2 is an operation timing diagram of the sub-pixel circuit shown in FIG. 1, and as shown in FIG. 1 and FIG. 2, the sub-pixel circuit includes a first transistor T1 (display switch transistor), a second transistor T2 (sensing switch transistor), a third transistor T3 (driving transistor), a storage capacitor Cst, and an organic light emitting diode OLED; a source of the first transistor T1 is coupled to a data line Data, a drain of the first transistor T1 is coupled to a first node N1, and a gate of the first transistor T1 is coupled to a scan line; a source of the second transistor T2 is coupled to a reading line ReadLine, a drain of the second transistor T2 is coupled to a second node N2, and a gate of the second transistor T2 is coupled to a sensing control line Sense; a source of the third transistor T3 is coupled to a first power voltage terminal VDD, a drain of the third transistor T3 is coupled to the second node N2, and a gate of the third transistor T3 is coupled to the first node N1; a first terminal of the storage capacitor Cst is coupled to the first node N1, and a second terminal of the storage capacitor Cst is coupled to the second node N2; an anode of the organic light emitting diode OLED is coupled to the second node N2, and a cathode of the organic light emitting diode OLED is coupled to a second power voltage terminal VSS.

When an external compensation is needed for the pixel circuit, the sub-pixel circuit includes at least the following two stages in the operation process: a display stage (including a writing process of a data voltage Vdata) and a sensing stage (including a current reading process).

At the display stage, the scan line is written with a high level signal, the first transistor is turned on, the data voltage Vdata in the data line Data is written into the first node N1, the storage capacitor Cst is charged, and the organic light emitting diode OLED is driven to emit light by the third transistor T3.

At the sensing stage, a high level signal is written into the scan line and the sensing control line Sense, the second transistor 12 and the third transistor T3 are turned on, a test voltage Ysense is written into the first node N1 through the data line Data, and an electric signal at the drain of the third transistor T3 is read through the second transistor T2 and output through the reading line ReadLine, so that an external compensation circuit compensates for mobility of the third transistor T3 through the output electric signal.

It should be noted that, the process of performing the external compensation on the sub-pixel circuit in the display panel belongs to the technology in the related art, and the detailed compensation process and principle are not described herein again.

Since a duration of the data writing process is longer than that of the current reading process, it is necessary to output a double-pulse signal within one frame time for the sensing control signal coupled to the gate of the second transistor T2, with a pulse width corresponding to the current reading process being greater than that corresponding to the data writing process, i.e., output the signal Scan2 in FIG. 2; therefore, each shift register in the gate driving circuit is required to have a function of outputting a double-pulse signal with two pulse widths different from each other.

In order to realize that the shift register can output a double-pulse signal, a first shift register unit, a second shift register unit and a signal combination circuit are used in the related art to form a shift register. In the gate driving circuit, first shift register units in the shift registers are cascaded, second shift register units in the shift registers are cascaded, each of the first shift register units is configured to output a driving signal for driving the third transistor T3 in the display stage, each of the second shift register units is configured to output a driving signal for driving the second transistor T2 in the sensing stage, and the signal combination circuit combines driving signals output by the first shift register unit and the second shift register unit in a same shift register, and outputs a double-pulse signal through the signal output terminal so as to meet the driving requirement.

Although the technical solution of forming the gate driving unit by two shift register units and one signal combination circuit can meet the driving requirement, the structure is complex, the number of transistors required to be arranged is relatively large, which is unfavourable for a narrow bezel design, In order to solve the above technical problem, embodiments of the present disclosure provide the following technical solutions.

Figure 3:
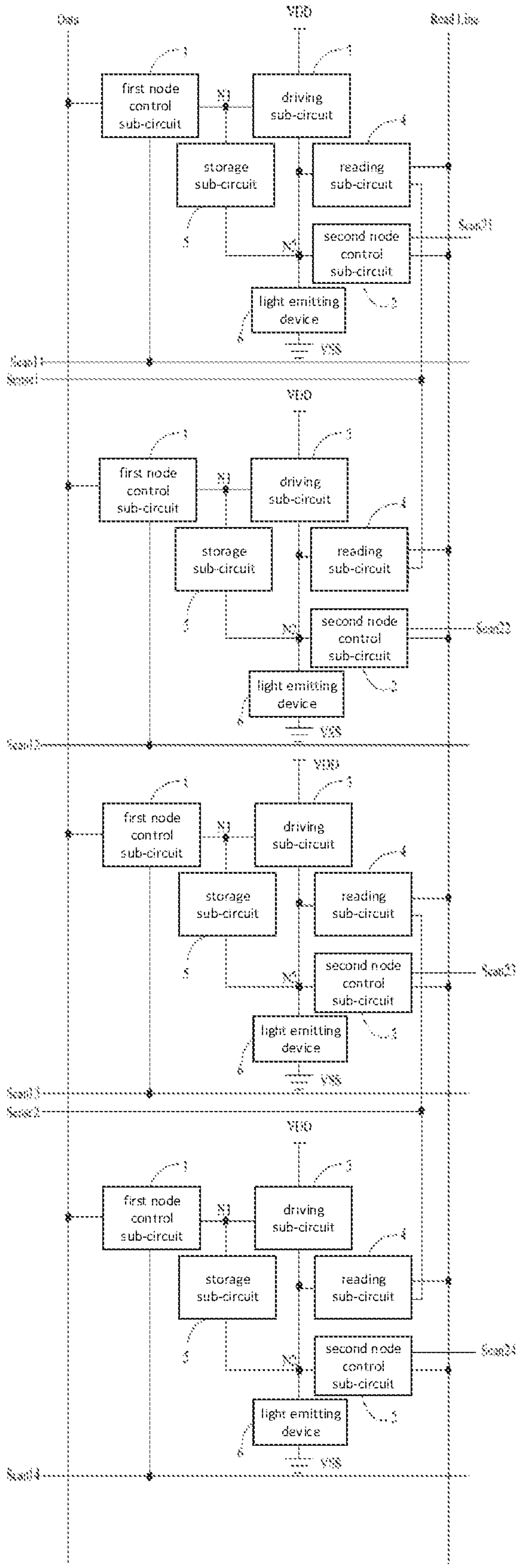
FIG. 3 is a block diagram of a pixel circuit according to an embodiment of the present disclosure.

In a first aspect, as shown in FIG. 3, an embodiment of the present disclosure provides a pixel circuit, which includes: a plurality of sub-pixel circuits arranged in an array; each of the plurality of sub-pixel circuits includes: a first node control sub-circuit 1, a second node control sub-circuit 2, a driving sub-circuit 3, a storage sub-circuit 5, a reading sub-circuit 4, and a light emitting device; where at least reading sub-circuits 4 in the sub-pixel circuits of a portion of different rows are controlled by a same sensing control line Sense; the first node control sub-circuit 1 is configured to write a data voltage signal Vdata into the first node N1 in response to a first scan signal, so as to charge the storage sub-circuit 5; the second node control sub-circuit 2 is configured to write a reference voltage signal into the second node N2 in response to a second scan signal; the reading sub-circuit 4 is configured to read a potential of the second node N2 in response to the sensing control line Sense, so as to compensate for the second node N2; the driving sub-circuit 3 is configured to output a driving current to drive the light emitting device to emit light in response to electric voltage signals of the first node N1 and the second node N2.

It should be noted here that the reading sub-circuit 4 reads the potential of the second node N2, which can help to compensate for the potential of the second node N2, for example, the mobility of the driving transistor in the driving sub-circuit 4 is compensated by an external compensation circuit.

In the pixel circuit of the embodiment of the present disclosure, the reading sub-circuits 4 in at least a portion of rows of sub-pixel circuits are controlled by the same sensing control line Sense, and thus in the shift registers correspondingly coupled with the rows of sub-pixel circuits controlled by the same sensing control line Sense, the second shift register unit can be arranged in only one shift register to output the sensing control signal. In this way, the structure of the gate driving circuit can be greatly simplified, which is helpful for the display panel to achieve a narrow bezel.

In some implementations, the first scan signal to which the first node control sub-circuit of the sub-pixel circuit located in an $(N+1)^{th}$ row responses is configured as the second scan signal to which the second node control sub-circuit of the sub-pixel circuit located in an $N^{th}$ row responses.

Specifically, taking the first sub-pixel circuit as an example, the first node control sub-circuit 1 is coupled to the first node N1, the data line Data, and the first scan line Scan11; the second node control sub-circuit 2 is coupled to the reading line ReadLine, the second node N2, and the second scan line Scan21; where, the first scan line coupled with the first node control sub-circuit of the sub-pixel circuit of the $(N+1)^{th}$ row is common to the second scan line coupled with the second node control sub-circuit of the sub-pixel circuit of the $N^{th}$ row; N is a natural number.

As shown in FIG. 3, taking four adjacent sub-pixel circuits in a same column as an example, and four first scan lines Scan11 to Scan14 are included; the second node control sub-circuit 2 in the first sub-pixel circuit is coupled to the first scan line Scan12 coupled to the first node control sub-circuit 1 in the second sub-pixel circuit, that is, to the first scan line Scan12 in a second row; the second node control sub-circuit 2 in the second sub-pixel circuit is coupled to the first scan line Scan13 coupled to the first node control sub-circuit 1 in the third sub-pixel circuit, that is, to the first scan line Scan13 in a third row; the second node control sub-circuit 2 in the third sub-pixel circuit is coupled to the first scan line Scan14 coupled to the first node control sub-circuit 1 in the fourth sub-pixel circuit, that is, to the first scan line Scan14 in the fourth row.

In some implementations, the rows of sub-pixel circuits controlled by the same sensing control line Sense are arranged adjacently, so as to facilitate the connection of the sensing control line Sense with the reading sub-circuits 4 in the rows of sub-pixel circuits.

Figure 4:
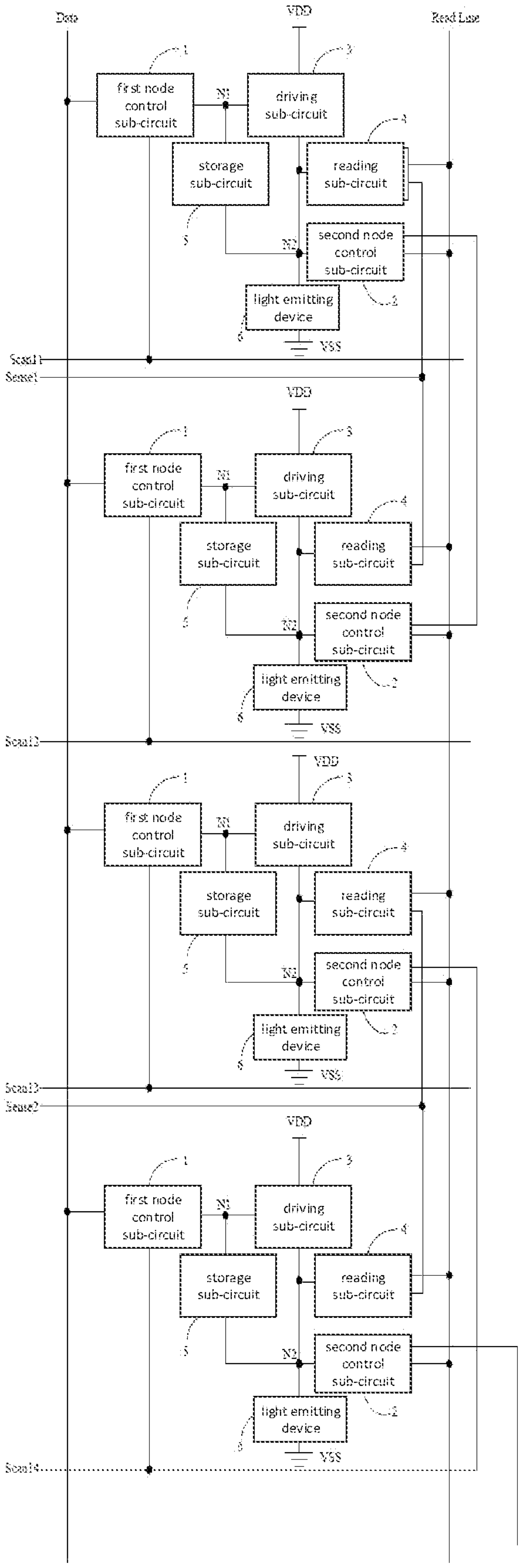
FIG. 4 is a block diagram of another pixel circuit according to an embodiment of the present disclosure.
Figure 5:
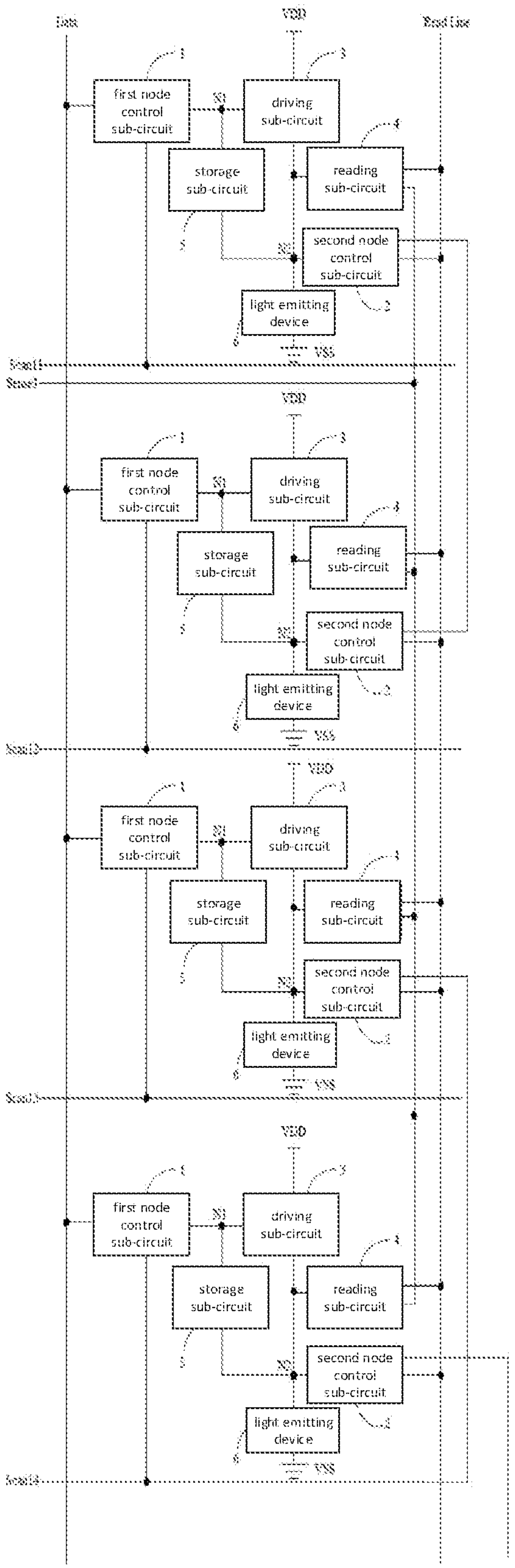
FIG. 5 is a block diagram of another pixel circuit according to an embodiment of the present disclosure.

Specifically, as shown in FIG. 4, the sub-pixel circuits of every two adjacent rows may be controlled by the same sensing control line Sense, or the sub-pixel circuits of every four adjacent rows may be controlled by the same sensing control line Sense. Certainly, as shown in FIG. 5, the sub-pixel circuits of every several rows disposed adjacently may be controlled by the same sensing control line Sense, which is not limited in the embodiments of the present disclosure.

Also, taking the pixel circuit shown in FIG. 4 as an example, the reading sub-circuits 4 in the first and second sub-pixel circuits are coupled to the same sensing control line Sense; the reading sub-circuits 4 in the third and fourth sub-pixel circuits are coupled to the same sensing control line Sense2, in this way, during the sensing stage, a high-level signal is written into the first scan line, a test signal written into the data line Data is the test voltage Vsense, and the test voltage Vsense should enable the driving sub-circuit 3 to output the driving current so as to drive the organic light emitting diode OLED to emit light. At the same time, a high-level signal is written into the sensing control line Sense to enable the reading sub-circuit 4 to operate, and the potential of the second node N2 is read for external compensation, such as mobility compensation.

In some implementations, the first node control sub-circuit 1 in each sub-pixel circuit includes the first transistor T1; the source of the first transistor T1 is coupled to the data line Data, the drain of the first transistor T1 is coupled. to the first node N1, and the gate of the first transistor T1 is coupled to the first scan line.

It should be noted that, in the embodiment of the present disclosure, the first node control sub-circuit 1 is not limited to including only the first transistor T1, and any circuit structure capable of writing the data voltage Vdata into the first node N1 under the control of the first scan signal is within the protection scope of the present disclosure.

Specifically, when a high-level signal is written into the first scan line, the first transistor T1 is turned on, and the data voltage Vdata written in the data line Data is transmitted to the first node N1, so that the storage sub-circuit 5 can be charged.

In some implementations, the second node control sub-circuit 2 in each sub-pixel circuit includes the second transistor T2; the source of the second transistor T2 is coupled to the reading line ReadLine, the drain of the second transistor T2 is coupled to the second node N2, and the gate of the second transistor T2 is coupled to the second scan line.

It should be noted that, in the embodiment of the present disclosure, the second node control sub-circuit 2 is not limited to including only the second transistor T2, and any circuit structure capable of writing the signal transmitted by the reading line ReadLine into the second node N2 under the control of the second scan signal is within the protection scope of the present disclosure.

Specifically, when a high-level signal is written into the second scan line, the second transistor T2 is turned on, and the reference voltage written into the reading line ReadLine is written into the second node N2.

In some implementations, the driving sub-circuit 3 includes the third transistor T3, the source of the third transistor T3 is coupled to the first power voltage terminal VDD, the drain of the third transistor T3 is coupled to the second node N2, and the control electrode of the third transistor T3 is coupled to the first node N1.

It should be noted that, in the embodiment of the present disclosure, the driving sub-circuit 3 is not limited to including only the third transistor T3, and any circuit structure capable of outputting the driving current to the organic light emitting diode OLED under the control of the first node and the second node is within the protection scope of the present disclosure.

Specifically, the driving transistor outputs the driving current to the second node N2 according to the voltage signals of the first node N1 and the second node N2 and the first power voltage written from the first power voltage terminal VDD, and transmits the driving current to the organic light emitting diode OLED, so that the organic light emitting diode OLED emits light.

In some implementations, the reading sub-circuit 4 includes a fourth transistor T4, a source of the fourth transistor T4 is coupled to the reading line ReadLine, a drain of the fourth transistor T4 is coupled to the second node N2, and a gate of the fourth transistor T4 is coupled to the sensing control line Sense.

It should be noted that, in the embodiment of the present disclosure, the reading sub-circuit 4 is not limited to including only the fourth transistor T4, and any circuit structure capable of outputting the voltage signal of the second node N2 to the reading line ReadLine under the control of the sensing control signal written by the sensing control line Sense is within the protection scope of the present disclosure.

Specifically, when the sensing control line Sense is input with a high-level signal, the fourth transistor T4 is turned on, and the potential of the second node N2 is read through the reading line ReadLine for external compensation.

In some implementations, the storage sub-circuit includes the storage capacitor Cst. The first terminal of the storage capacitor Cst is coupled to the first node N1, and the second terminal of the storage capacitor Cst is coupled to the second node N2. The storage capacitor Cst can store the data voltage Vdata written from the data line Data.

It should be noted that, in the embodiment of the present disclosure, the storage sub-circuit is not limited to including only the storage capacitor Cst, and may also include other elements with an energy storage function.

In an example, as shown in FIG. 5, four sub-pixel circuits disposed adjacently in a same column are taken as an example for explanation. Each sub-pixel circuit includes the first node control sub-circuit 1, the second node control sub-circuit 2, the driving sub-circuit 3, the storage sub-circuit 5 and the light emitting device; where, the first node control sub-circuit 1 includes the first transistor T1; the second node control sub-circuit 2 includes the second transistor T2; the driving sub-circuit 3 includes the third transistor T3; the reading sub-circuit 4 includes the fourth transistor T4; the storage sub-circuit 5 includes the storage capacitor Cst; the light emitting device includes an organic light emitting diode OLED.

Specifically, the source of the first transistor T1 is coupled to the data line Data, the drain of the first transistor T1 is coupled to the first node N1, and the gate of the first transistor T1 is coupled to the first scan line; the source of the second transistor T2 is coupled to the reading line ReadLine, the drain of the second transistor T2 is coupled to the second node N2, and the gate of the second transistor T2 is coupled to the second scan line; the source of the third transistor T3 is coupled to the first power voltage terminal VDD, the drain of the third transistor T3 is coupled to the second node N2, and the gate of the third transistor T3 is coupled to the first node N1; the source of the fourth transistor T4 is coupled to the reading line ReadLine, the drain of the fourth transistor T4 is coupled to the second node N2, and the gate of the fourth transistor T4 is coupled to the sensing control line Sense; the first terminal of the storage capacitor Cst is coupled to the first node N1, and the second terminal of the storage capacitor Cst is coupled to the second node N2; the anode of the organic light emitting diode OLED is coupled to the second node N2, and the cathode of the organic light emitting diode OLED is coupled to the second power voltage terminal VSS.

Figure 6:
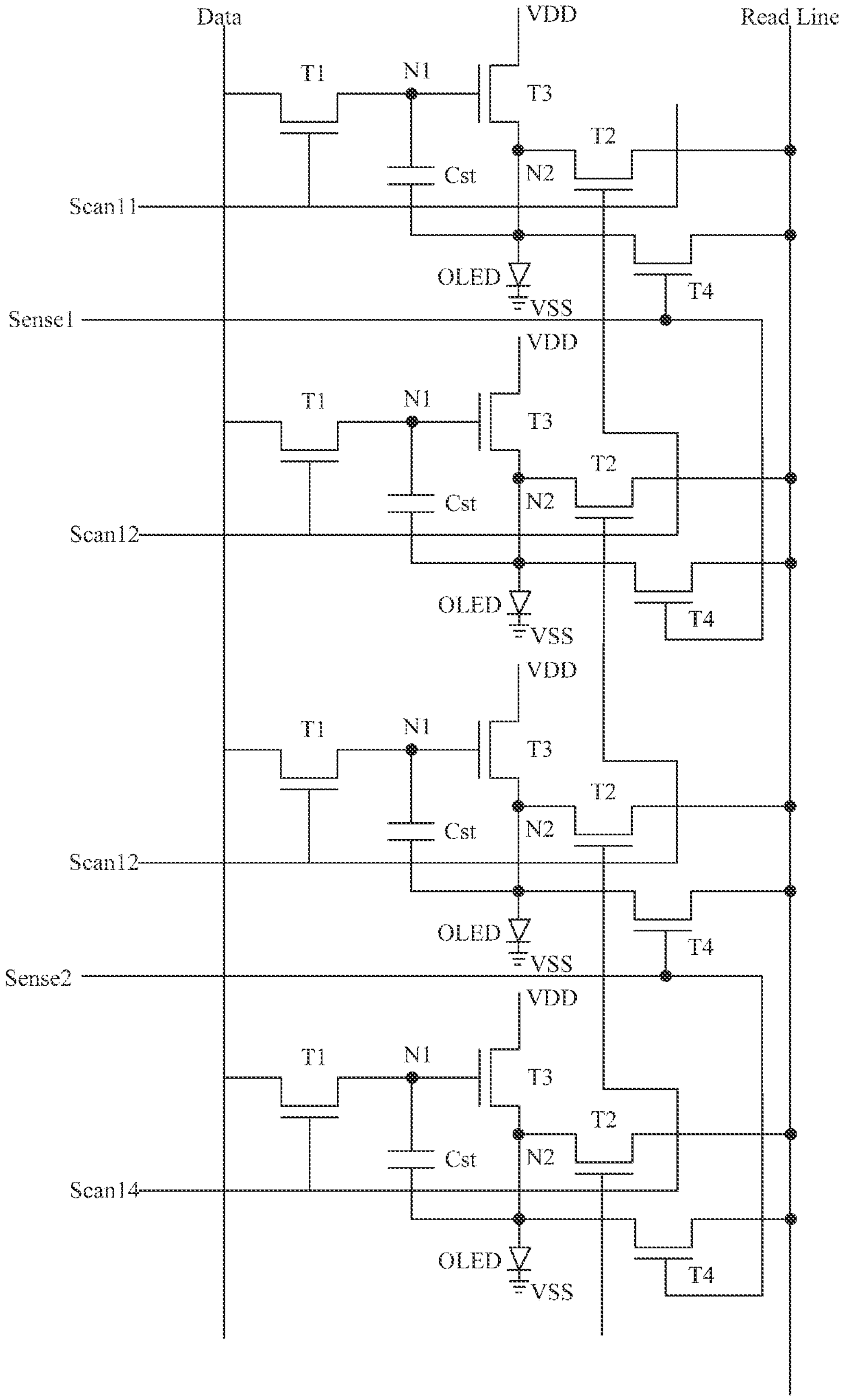
FIG. 6 is a circuit diagram of a pixel circuit according to an embodiment the present disclosure.

As shown in FIG. 6, the second scan line to which the gate of the second transistor T2 in the first sub-pixel circuit is coupled is common to the first scan line to which the gate of the first transistor T1 in the second sub-pixel circuit is coupled; the second scan line to which the gate of the second transistor T2 in the second sub-pixel circuit is coupled is common to the first scan line to which the gate of the first transistor T1 in the third sub-pixel circuit is coupled; the second scan line to which the gate of the second transistor T2 in the third sub-pixel circuit is coupled is common to the first scan line to which the gate of the first transistor T1 in the fourth sub-pixel circuit is coupled.

As shown in FIG. 6, gates of fourth transistors T4 in the first and second sub-pixel circuits are coupled to the same sensing control line Sense; gates of fourth transistors T4 in the third and fourth sub-pixel circuits are coupled to the same sensing control line Sense. Certainly, it is possible for the gates of the fourth transistors T4 in the first, second, third and fourth sub-pixel circuits all to be coupled to the same sensing control line Sense.

In the pixel circuit of the embodiment of the present disclosure, the gates of the fourth transistors T4 of the reading sub-circuits 4 in at least some rows of sub-pixel circuits are coupled to the same sensing control line Sense, so that among the shift registers correspondingly coupled to the rows of sub-pixel circuits controlled by the same sensing control line Sense, the second shift register unit can be provided in only one shift register to output the sensing control signal. In this way, the structure of the gate driving circuit can be remarkably simplified, facilitating achievement of a narrow bezel of the display panel.

In a second aspect, an embodiment of the present disclosure provides a driving method of a pixel circuit, which includes a display stage and a sensing phase.

At the display stage, the first node control sub-circuit 1 writes a data voltage signal Vdata into the first node N1 under the control of the first scan signal, the second node control sub-circuit writes a reference voltage signal into the second node N2 under the control of the second scan signal, and the driving sub-circuit 3 is controlled by potentials of the first node N1 and the second node N2 to drive the light emitting device to emit light.

At the sensing stage, under the control of the first scan signal, the first node control sub-circuit 1 writes a sense signal into the first node N1, and under the control of the sensing control signal input from the sensing control line Sense, the reading sub-circuit 4 reads the potential of the second node N2 and output it through the reading line ReadLine.

In the pixel circuit of the embodiment of the disclosure, the reading sub-circuits 4 in at least some rows of sub-pixel circuits are coupled with the same sensing control line Sense, so that among the shift registers correspondingly coupled to the rows of sub-pixel circuits controlled by the same sensing control line Sense, the second shift register unit can be provided in only one shift register to output the sensing control signal. In this way, the structure of the gate driving circuit can be remarkably simplified, facilitating the achievement of a narrow bezel of the display panel.

Figure 7:
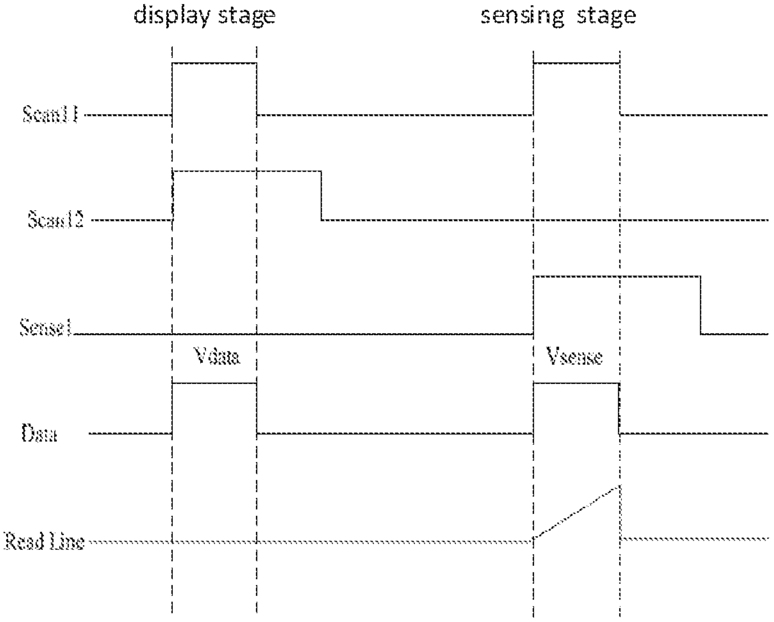
FIG. 7 is a driving timing diagram of the pixel circuit of FIG. 6.

In order to make the driving method of the pixel circuit in the embodiment of the present disclosure clearer, the pixel circuit shown in FIG. 6 is used in conjunction with the timing diagram shown in FIG. 7 to describe the driving method of the pixel circuit in the embodiment of the present disclosure.

Taking driving the first sub-pixel circuit as an example.

At the display stage, an operation level signal is written into first scan lines of first and second rows, the first transistor T1 and the second transistor T2 are turned on, the data voltage Vdata is written into the data line Data, the reference voltage is written into the reading line ReadLine, in such case, the potential of the first node N1 is the data voltage Vdata, the potential of the second node N2 is the reference voltage, the storage capacitor Cst stores charges of the first node N1 and the second node N2, since Vdata−Vref>Vth, where Vth is a threshold voltage of the third transistor T3, and at this time, the third transistor T3 is turned on to provide the driving current for the organic light emitting diode OLED.

At the sensing stage, an operation level signal is written into the first scan line of the first row and the sensing control line Sense of the first row, the first transistor T1 and the fourth transistor T4 are turned on, a test voltage Vsense is written into the data line Data, in such case, the potential of the first node N1 is at the test voltage Vsense, and the third transistor T3 is turned on by the test voltage Vsense to drive the organic light emitting diode OLED to emit light; meanwhile, the fourth transistor T4 reads the potential of the second node N2 and outputs it through the reading line ReadLine for external compensation, for example, compensating the mobility of the driving transistor.

It should be noted that, when the potential of the second node N2 of the first sub-pixel circuit is sensed, the organic light emitting diode OLED in the second sub-pixel circuit is controlled not to display, so as to avoid affecting the accuracy of sensing the potential of the second node N2 of the first sub-pixel circuit.

In a third aspect, an embodiment of the present disclosure provides a display panel, which includes any one of the pixel circuits described above.

Certainly, the display panel further includes a gate driving circuit, where the gate driving circuit includes P stages of shift register arranged in one-to-one correspondence with rows of sub-pixel circuits; where, the first scan line of the row is coupled with a scan signal output terminal of the shift register of the stage, 1≤i≤P; where, i and P are both natural numbers; the shift register coupled to one row of the sub-pixel circuits coupled to the same sensing control line Sense has a sensing signal output terminal and is coupled to the sensing control line Sense.

Figure 8:
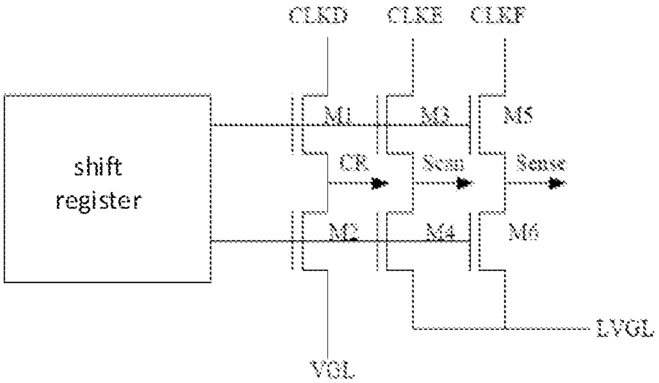
FIG. 8 is a schematic diagram of a shift register.

As shown in FIG. 8, a schematic structural diagram of a shift register for outputting the first scan signal and the sensing control signal is shown. The shift register includes a first register unit and a second shift register unit; the first shift register unit is configured to output the first scan signal, the second shift register unit is configured to output the sensing control signal. The shift register has six transistors (M1 to M6), three clock signal terminals (CLKD, CLKE, CLKF), one low-level signal terminal VGL, one low-level signal terminal LVDL, one cascade terminal CR, one scan signal output terminal Scan and one sensing signal output terminal Sense.

Figure 9:
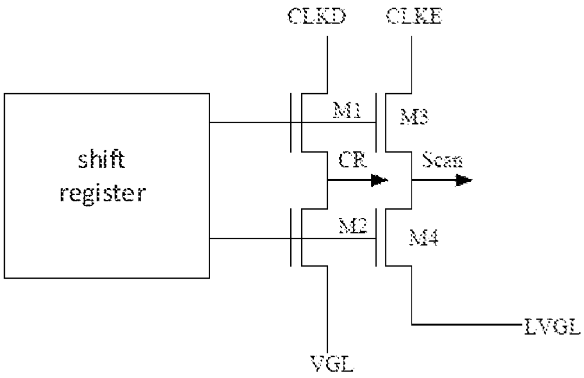
FIG. 9 is a schematic diagram of a shift register.

As shown in FIG. 9, a schematic diagram of a shift register for outputting only the first scan signal is shown. The shift register includes only a first register unit; the first shift register unit is configured to output the first scan signal, and the shift register unit has four transistors (M1-M4), two clock signal terminals (CLKD, CLKE), one low-level signal terminal VGL, one low-level signal terminal LVDL, one cascade terminal CR and one scan signal output terminal Scan.

In the pixel circuits of the display panel according to the embodiment of the present disclosure, the reading sub-circuits 4 of at least some rows of sub-pixel circuits are controlled by the same sensing control line Sense, so that among the shift registers correspondingly coupled to the rows of sub-pixel circuits controlled by the same sensing control line Sense, the second shift register unit can be provided in only one shift register to output the sensing control signal. In this way, the structure of the gate driving circuit can be remarkably simplified, facilitating the achievement of a narrow bezel of the display panel.

It will be understood that the above embodiments are merely exemplary embodiments adopted to illustrate the principles of the present disclosure, and the present disclosure is not limited thereto. It will be apparent to those skilled in the art that various modifications and improvements can be made without departing from the spirit and scope of the disclosure, and such modifications and improvements are also considered to be within the scope of the disclosure.

The invention claimed is:

1. A pixel circuit, comprising: a plurality of sub-pixel circuits arranged in an array; each of the plurality of sub-pixel circuits comprises a first node control sub-circuit, a second node control sub-circuit, a driving sub-circuit, a storage sub-circuit, a reading sub-circuit and a light emitting device; wherein at least reading sub-circuits of the sub-pixel circuits of a portion of rows are controlled by a same sensing control line;

the first node control sub-circuit is configured to charge the storage sub-circuit in response to a first scan signal;

the second node control sub-circuit is configured to write a reference voltage signal into a second node in response to a second scan signal;

the reading sub-circuit is configured to read a potential of the second node in response to a sensing control signal written by a sensing control line; and the driving sub-circuit is configured to drive the light emitting device to emit light in response to voltage signals of the first node and the second node;

wherein the reading sub-circuit comprises a fourth transistor, a first electrode of the fourth transistor is coupled to a reading line, a second electrode of the fourth transistor is coupled to the second node, and a control electrode of the fourth transistor is coupled to the sensing control line.

2. The pixel circuit of claim 1, wherein the first scan signal to which the first node control sub-circuit of the sub-pixel circuit in an $(N+1)^{th}$ row responses is configured as the second scan signal to which the second node control sub-circuit of the sub-pixel circuit in an Nth row responses.

3. The pixel circuit of claim 2, wherein the first node control sub-circuit is coupled to the first node, a data line, and a first scan line; the second node control sub-circuit is coupled to a reading line, the second node and a second scan line; wherein, the first scan line to which the first node control sub-circuit of the sub-pixel circuit of the $(N+1)^{th}$ row is coupled is common to the second scan line to which the second node control sub-circuit of the sub-pixel circuit of the $N^{th}$ row is coupled; N is a natural number.

4. The pixel circuit of claim 1, wherein the rows of sub-pixel circuits controlled by the same sensing control line are adjacent to each other.

5. The pixel circuit of claim 4, wherein every two or four adjacent rows of sub-pixel circuits are controlled by the same sensing control line.

6. The pixel circuit of claim 1, wherein the first node control sub-circuit comprises a first transistor;

a first electrode of the first transistor is coupled with a data line, a second electrode of the first transistor is coupled with the first node, and a control electrode of the first transistor is coupled with a first scan line.

7. The pixel circuit of claim 1, wherein the second node control sub-circuit comprises a second transistor;

a first electrode of the second transistor is coupled with a reading line, a second electrode of the second transistor is coupled with the second node, and a control electrode of the second transistor is coupled with a second scan line.

8. The pixel circuit of claim 1, wherein the driving sub-circuit comprises a third transistor;

a first electrode of the third transistor is coupled to a first power voltage terminal, a second electrode of the third transistor is coupled to the second node, and a control electrode of the third transistor is coupled to the first node.

9. The pixel circuit of claim 1, wherein the storage sub-circuit comprises a storage capacitor;

a first terminal of the storage capacitor is coupled with the first node, and a second terminal of the storage capacitor is coupled with the second node.

10. The pixel circuit of claim 1, wherein the light emitting device comprises an organic light emitting diode;

a first electrode of the organic light emitting diode is coupled with the second node, and a second electrode of the organic light emitting diode is coupled with a second power voltage terminal.

11. The pixel circuit of claim 1, wherein the first node control sub-circuit comprises a first transistor; the second node control sub-circuit comprises a second transistor; the driving sub-circuit comprises a third transistor; the reading sub-circuit comprises a fourth transistor; the storage sub-circuit comprises a storage capacitor; the light emitting device comprises an organic light emitting diode;

a first electrode of the first transistor is coupled with a data line, a second electrode of the first transistor is coupled with the first node, and a control electrode of the first transistor is coupled with a first scan line;

a first electrode of the second transistor is coupled with a reading line, a second electrode of the second transistor is coupled with the second node, and a control electrode of the second transistor is coupled with a second scan line;

a first electrode of the third transistor is coupled with a first power voltage terminal, a second electrode of the third transistor is coupled with the second node, and a control electrode of the third transistor is coupled with the first node;

a first electrode of the fourth transistor is coupled with the reading line, a second electrode of the fourth transistor is coupled with the second node, and a control electrode of the fourth transistor is coupled with the sensing control line;

a first terminal of the storage capacitor is coupled with the first node, and the second terminal of the storage capacitor is coupled with the second node; and a first electrode of the organic light emitting diode is coupled with the second node, and the second electrode of the organic light emitting diode is coupled with a second power voltage terminal.

12. A driving method of the pixel circuit of claim 1, comprising: a display stage and a sensing stage; wherein, at the display stage, under a control of the first scan signal, the first node control sub-circuit writes a data voltage signal into the first node, under a control of the second scan signal, the second node control sub-circuit writes the reference voltage signal into the second node, and the driving sub-circuit is controlled, by potentials of the first node and the second node, to drive the light emitting device to emit light;

at the sensing stage, under the control of the first scan signal, the first node control sub-circuit writes a sensing signal into the first node, and under the control of the sensing control signal input by the sensing control line, the reading sub-circuit reads the potential of the second node and output it through a reading line.

13. A display panel, comprising the pixel circuit of claim 1.

14. The display panel of claim 13, further comprising a gate driving circuit; the gate driving circuit comprises P stages of shift registers; wherein, the first scan line in the $i^{th}$ row is coupled with a scan signal output terminal of the shift register at the $i^{th}$ stage, i is greater than or equal to 1 and is less than or equal to P, and i and P are both natural numbers; and the shift register coupled to one row of the sub-pixel circuits coupled to the same sensing control line has a sensing signal output terminal and is coupled to the sensing control line.

15. The pixel circuit of claim 2, wherein the first node control sub-circuit comprises a first transistor;

a first electrode of the first transistor is coupled with a data line, a second electrode of the first transistor is coupled with the first node, and a control electrode of the first transistor is coupled with a first scan line.

16. The pixel circuit of claim 2, wherein the second node control sub-circuit comprises a second transistor;

a first electrode of the second transistor is coupled with a reading line, a second electrode of the second transistor is coupled with the second node, and a control electrode of the second transistor is coupled with a second scan line.

17. The pixel circuit of claim 2, wherein the driving sub-circuit comprises a third transistor;

a first electrode of the third transistor is coupled to a first power voltage terminal, a second electrode of the third transistor is coupled to the second node, and a control electrode of the third transistor is coupled to the first node.

18. The pixel circuit of claim 2, wherein the reading sub-circuit comprises a fourth transistor;

a first electrode of the fourth transistor is coupled to a reading line, a second electrode of the fourth transistor is coupled to the second node, and a control electrode of the fourth transistor is coupled to the sensing control line.

19. The pixel circuit of claim 2, wherein the storage sub-circuit comprises a storage capacitor;

a first terminal of the storage capacitor is coupled with the first node, and a second terminal of the storage capacitor is coupled with the second node.

* * * * *